Patented Feb. 2, 1954

2,668,096

UNITED STATES PATENT OFFICE 2,668,096

FLAMEPROOF FIBROUS AMINOETHYLATED CELLULOSE DERIVATIVES

Wilson A. Reeves and John D. Guthrie, New Orleans, La., assignors to the United States of America as represented by the Secretary of Agriculture No Drawing. Application April 22, 1952, Serial No. 283,743

6 Claims. (Cl. 8—115.5)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to fibrous cellulose derivatives containing phosphorus and nitrogen atoms and to a process for their production.

Cellulose fibers in the form of free fibers, textiles, or textile intermediates such as slivers, yarns, threads, and the like, can be converted to fibrous cellulose derivatives containing primary amino groups. For example, U. S. 2,459,222 describes and claims such a process by which cellulose is wetted with an aqueous solution of sodium hydroxide containing 2-amino ethyl sulfuric acid. The treated cellulose is heated at a temperature of from about 70 to 110° C. for a minimum period of from 40 minutes to 9 hours, after which the cellulose is washed to remove sodium hydroxide. Nitrogen up to about 0.6% is readily introduced by this procedure.

We have discovered that fibrous cellulose derivatives containing primary amino groups react with tetrakis(hydroxymethyl) phosphonium chloride to produce fibrous cellulose derivatives containing phosphorus as well as nitrogen. The combustibility of these phosphorus and nitrogen-containing cellulose derivatives is markedly lower than that of cellulose fibers or aminized cellulose fibers and the groups responsible for the lowered combustibility appear to be attached to the cellulose fibers by relatively strong chemical bonds. We have also discovered that the reaction of tetrakis(hydroxymethyl) phosphonium chloride with the primary amino groups of aminized cellulose occurs concurrently with reactions of tetrakis(hydroxymethyl) phosphonium chloride with at least one polyamido compound of the group consisting of melamine, guanidine and urea as well as with reactions of tetrakis(hydroxymethyl) phosphonium chloride with such polyamido compounds and with formaldehyde when the polyamido compound or when both the polyamido compound and the formaldehyde are in contact with the aminized cellulose during its reaction with tetrakis(hydroxymethyl) phosphonium chloride.

Our co-pending application, Serial No. 283,744, filed April 22, 1952, relates to similar polymers of tetrakis(hydroxymethyl) phosphonium chloride with amino derivatives, which are useful either as polymers per se, or as coatings for textile materials.

In general, according to this invention, aminized cellulose fibers containing primary amino groups: are converted to fibrous derivatives of cellulose containing phosphorus and nitrogen atoms by reacting them with tetrakis(hydroxymethyl) phosphonium chloride; are converted to fibrous derivatives of cellulose containing phosphorus and nitrogen atoms and impregnated with a chemically bonded condensation polymer of tetrakis(hydroxymethyl) phosphonium chloride and at least one polyamido compound of the group consisting of melamine, guanidine and urea by reacting them with tetrakis(hydroxymethyl) phosphonium chloride and the polyamido compound; and are converted to fibrous derivatives of cellulose containing phosphorus and nitrogen atoms and impregnated with a chemically bonded condensation polymer of tetrakis(hydroxymethyl) phosphonium chloride and such a polyamido compound for formaldehyde by reacting them with tetrakis(hydroxymethyl) phosphonium chloride and the polyamido compound and formaldehyde.

This invention thus makes it possible to convert cellulose fibers, in the form of free fibers, textiles, or textile intermediates, to fibers having special properties and having a hand and feel comparable to those of aminized cellulose fibers, but having a lower combustibility than either unmodified cellulose fibers or aminized cellulose fibers.

The fibrous derivatives of cellulose provided by this invention are relatively durable and laundering and the like treatments make comparatively small changes in their resistance to burning. The derivatives are particularly suitable for use in the production of fabrics for military and the like uses where low combustibility is desired.

Preferred aminized cellulose fibers for conversion by the present process consist of spun aminoethylated cotton cellulose fibers (i. e., cotton yarns, threads, and textiles which were aminoethylated before or after spinning) containing from about 0.3 to about 1.5% nitrogen.

Throughout this specification and claims, percent or parts refer to percentages or parts by weight.

The reaction of the aminized cellulose fibers with tetrakis(hydroxymethyl) phosphonium chloride alone is perferably conducted by: impregnating the cellulose fibers with an aqueous solution containing from about 5 to about 35% of tetrakis(hydroxymethyl) phosphonium chloride; mechanically removing the excess liquid and curing the impregnated fabrics at from about 80 to about 160° C. for from about 4 to about 30 minutes, using the longer times with the lower temperatures. The uncombined reagents are preferably removed from the cured fibers by water washing. The concentration of tetrakis(hydroxymethyl) phosphonium chloride in the aqueous impregnating liquid and the curing times and temperatures can suitably be varied widely.

The reaction of the aminized cellulose fibers concurrently with tetrakis(hydroxymethyl) phosphonium chloride and with a polyamido compound is preferably conducted by: dissolving the polyamido compound and from about 1 to about 2 parts of tetrakis(hydroxymethyl) phosphonium chloride per part of unsubstituted amido group presented by the polyamido compound in from about 3 to about 10 parts of water per part of total weight of polyamido compound and phosphonium chloride by agitating a mixture of the polyamido compound, the phosphonium chloride and water at from about 25 to about 80° C.; impregnating the cellulose fibers with the resultant aqueous solution and curing the impregnated fabrics at from about 80 to about 160° C. for from about 4 to about 30 minutes, using the longer times with the lower temperatures.

The reaction of the aminized cellulose fibers concurrently with tetrakis(hydroxymethyl) phosphonium chloride and polyamide compound and formaldehyde is preferably conducted by: mixing tetrakis(hydroxymethyl) phosphonium chloride with about an equal part of a water-soluble partial (i. e., incompletely reacted) reaction product of the polyamido compound and formaldehyde, dissolving the resultant mixture in a weight of water about equal to the weight of the mixture and warming the solution until it has a viscosity slightly greater than that of water, impregnating the cellulose fiber with the solution so produced; and curing the impregnated fibers at from about 80 to about 160° C. for from about 4 to about 30 minutes, using the longer times with the lower temperatures.

A water-soluble, basically reacting compound can suitably be used to neutralize any hydrochloric acid formed during reaction of tetrakis(hydroxymethyl) phosphonium chloride with an amino or amido group. Such a neutralization reduces the tendency of the acid to decrease the tensile strength of fibrous cellulose derivatives. Neutralization is preferably accomplished by the use of a water-soluble carbonate such as sodium carbonate or guanidine carbonate, or by adding urea to the reaction mixture. The presence of a slight excess of a water-soluble base is advantageous in that it catalyzes some of the described reactions. The presence of urea is advantageous in that urea appears to react and become chemically combined with the fibrous cellulose derivatives, increasing their nitrogen content and thus generally increasing their resistance to burning.

The following examples are illustrative of the invention:

*Example 1*

A 33% aqueous solution of tetrakis(hydroxymethyl) phosphonium chloride was swabbed onto a highly aminized cotton cloth (prepared in accordance with the process of U. S. 2,459,222 and having a nitrogen content of 1.6%). The impregnated cloth was cured at 117 to 120° C. for 15 minutes, washed for 1½ hours with hot tap water, and dried.

Although the treated cloth was stiff and boardy, it was not appreciably stiffer or more boardy than was the cloth prior to reaction with tetrakis(hydroxymethyl) phosphonium chloride. The treated cloth would do the 130 to 135° angle flame test with no afterglow. The treated cloth retained its flame- and glow-resistance after 1 hour in a boiling solution of 5 g. of A. S. T. M. standard soap flakes (D496-39) and 1 g. of sodium carbonate in 500 mm. of water. It also retained its flame- and glow-resistance after being boiled for 2 hours and 45 minutes in an aqueous 1% sodium hydroxide solution.

*Example 2*

A piece of aminized fabric (prepared in accordance with the process of U. S. 2,459,222, having an N content of 0.67%) was impregnated with a solution prepared by mixing a mixture of tetrakis(hydroxymethyl) phosphonium chloride and melamine in about a 2:1 weight ratio with an approximately equal weight of water containing a small amount of acetic acid, and agitating the mixture for about 20 minutes at about 80 to 90° C. The impregnated fabric was dried at 80° C. and cured 5 minutes at 150° C.

The treated cloth would do the 180° angle flame test after it was washed for 0.5 hours with hot tap water. After it was boiled for 30 minutes in an aqueous 1% sodium hydroxide solution it would do the 180° angle flame test with a slight burning.

*Example 3*

A piece of aminized fabric (prepared in accordance with the process of U. S. 2,459,222 having a nitrogen content of 0.67%) was impregnated with a solution prepared by mixing two parts of tetrakis(hydroxymethyl) phosphonium chloride with one part of methylol melamine and three parts of water at room temperature. The impregnated fabric was dried at 65° C. and cured 4 minutes at 155° C.

The resultant fabric was completely flameproof. The fabric would not burn even after boiling for 30 minutes in a 1% soap solution containing 0.2% sodium carbonate.

We claim:

1. A fibrous derivative of cellulose, containing phosphorus and nitrogen atoms, produced by reacting aminized cellulose fibers, containing a plurality of primary amino groups, with tetrakis(hydroxymethyl) phosphonium chloride.

2. A fibrous derivative of cellulose, containing phosphorus and nitrogen atoms and impregnated with a chemically bonded condensation polymer of tetrakis(hydroxymethyl) phosphonium chloride and melamine, produced by reacting aminized cellulose fibers, containing a plurality of amino groups, with an aqueous solution of partially reacted tetrakis(hydroxymethyl) phosphonium chloride and melamine.

3. A fibrous derivative of cellulose containing phosphorus and nitrogen atoms and impregnated with a chemically bonded condensation polymer of tetrakis(hydroxymethyl) phosphonium chloride and at least one polyamido compound of the group consisting of melamine, guanidine and urea produced by impregnating aminized cellulose fibers containing a plurality of primary amino groups with an aqueous solution of a partially reacted mixture of tetrakis(hydroxymethyl) phosphonium chloride and said polyamido compound and curing the impregnated fibers at from about 80 to about 160° C. for from about 4 to about 30 minutes, using the longer times with the lower temperatures.

4. A process of reducing the combustibility of aminized cotton fabrics comprising impregnating said fabrics with an aqueous solution of tetrakis-(hydroxymethyl) phosphonium chloride and curing the impregnated fabrics at from about 80 to about 160° C. for from about 4 to about 30 minutes, using the longer times with the lower temperatures.

5. A process of flameproofing a cotton fabric which comprises: aminoethylating the fabric until it contains from about 0.3 to about 1.5% nitrogen; impregnating the aminoethylated fabric with a water solution of at least one of the three members of the group consisting of (1) tetrakis(hydroxymethyl) phosphonium chloride, (2) water soluble partial reaction products of tetrakis(hydroxymethyl) phosphonium chloride and a polyamide of the group consisting of melamine, guanidine and urea, and (3) water soluble partial reaction products of tetrakis-(hydroxymethyl) phosphonium chloride, formaldehyde, and a polyamide of the group consisting of melamine, guanidine and urea; and curing the impregnated fabric at from about 80 to about 160° C. for from about 4 to about 30 minutes, using the longer times with the lower temperatures.

6. A process comprising: impregnating an aminized cellulose fabric containing a plurality of primary amino groups with a water solution of at least one of the three members of the group consisting of (1) tetrakis(hydroxymethyl) phosphonium chloride, (2) water soluble partial reaction products of tetrakis(hydroxymethyl) phosphonium chloride and a polyamide of the group consisting of melamine, guanidine and urea, and (3) water soluble partial reaction products of tetrakis(hydroxymethyl) phosphonium chloride, formaldehyde, and a polyamide of the group consisting of melamine, guanidine and urea; and curing the impregnated fabric at from about 80 to about 160° C. for from about 4 to about 30 minutes, using the longer times with the lower temperatures.

WILSON A. REEVES.
JOHN D. GUTHRIE.

No references cited.